2,830,291

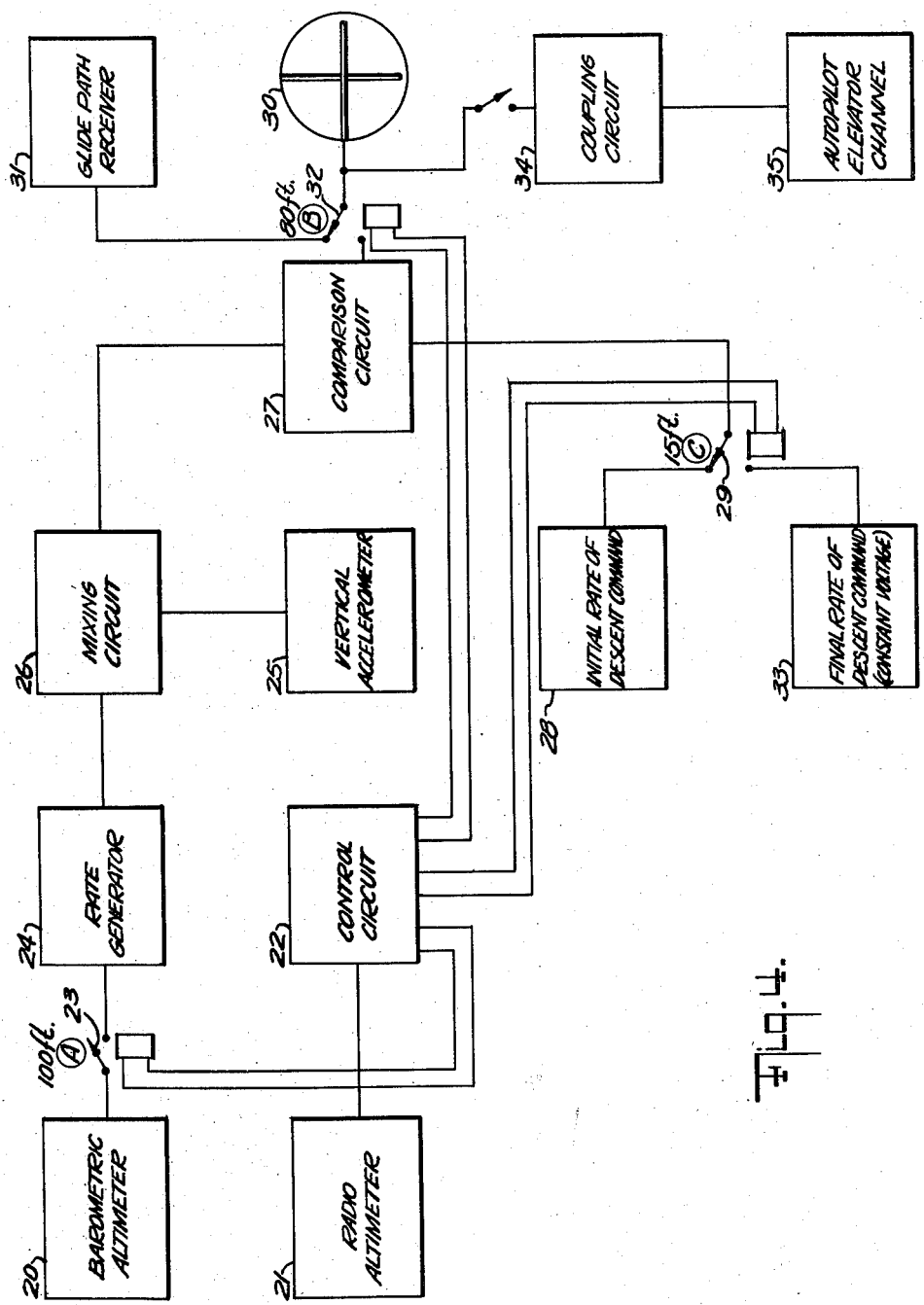

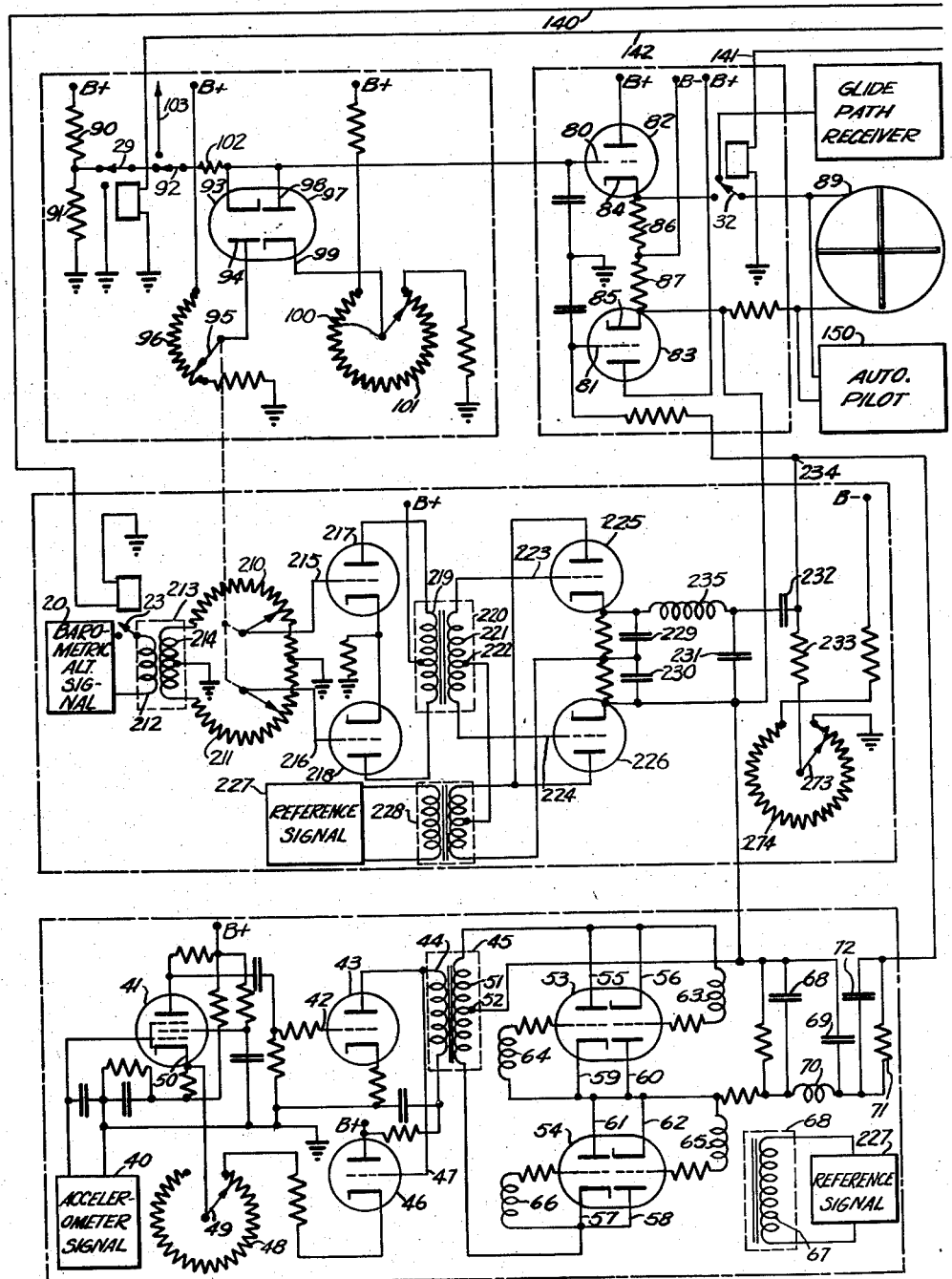

FLARE-OUT CONTROL

Herbert Hecht, Wantagh, and Myron B. Glaser, East Williston, N. Y., assignors to Sperry Rand Corporation, a corporation of Delaware Application September 23, 1954, Serial No. 457,852

13 Claims. (Cl. 343—108)

This invention relates to a system for guiding a craft on a selectable, predetermined course of flight under adverse weather conditions.

More particularly, the prime object of the present invention is to guide the vertical descent of an aircraft to a safe and efficient landing regardless of poor visibility and low ceiling which may completely obscure the runway or landing area.

Apparatus operating in accordance with the present invention may be utilized in a flight indicating system by which a pilot can guide an aircraft's descent to a safe landing without relying at any time or iny way whatever upon visible perception of the actual runway or landing area. Apparatus arranged to operate in accordance with the present invention may also be combined with automatic pilot means to effect completely automatic instrument landing control up to and including touchdown of the aircraft and wherein the indicating system may be retained for monitoring the operation of the automatic pilot.

Various systems have been devised to guide an aircraft from an outlying area to the vicinity of the landing field and runways. Two of such systems which enjoy general acceptance and favor are the GCA (ground control approach) and the ILS (instrument landing system) glide path approach. The present invention is concerned with effecting low altitude control of the aircraft after it has approached under the guidance of a system such as GCA or glide path control, and for that reason the practice of the present invention is not restricted to use in combination with either of the two systems mentioned, nor is it restricted to use in conjunction with any other one particular system or type of approach system.

Referring to a glide path system for purposes of illustration, the part which the present invention performs in a typical complete instrument landing system may be better appreciated. The localizer of such a system has the purpose of guiding an aircraft with respect to a fixed or determinable azimuthal course of flight. The localizer thus determines the approach of an aircraft from a relatively far-out distance from the landing field insofar as lateral displacement from a desired heading is concerned. This, however, has no necessary bearing upon the vertical descent or let-down of the aircraft as it approaches.

The glide path guidance serves the purpose of directing the aircraft on a fixed or determinable vertical course of flight as it approaches. Usually an aircraft is guided simultaneously by signals from both localizer and glide path transmitters so that the desired course of approach is defined in the horizontal plane by azimuthal heading and in the vertical plane by rate or angle of descent.

At relatively low altitudes, which may nominally be considered to be those altitudes under approximately one hundred feet for the purposes of the disclosure of this invention and the explanation of its operation, the effectiveness of approach systems such as glide path, etc. is greatly reduced because of inaccuracies arising from a number of causes.

The glide path beam at low altitudes may be noisy and comparatively erratic signal-wise. Also there is an effect experienced whereby a glide path beam will tend to bend near the earth's surface. Because of the wedge shaped nature of the glide path beam, the course width is very narrow at low altitudes causing unstable characteristics in the control system. These and other factors render the glide path beam unsuitable for effecting control and guidance of an aircraft at low altitudes with the desired degree of accuracy for landing operations culminating in the actual touchdown of the aircraft.

The present invention contemplates directing an aircraft in its flight from the glide path (or other initial approach pattern) to the actual landing of the aircraft by touchdown of the undercarriage. Obviously, the flight of the aircraft during such period must be precisely controlled, particularly with regard to the vertical velocity of the aircraft. The requirements of such a system are therefore focused with particular emphasis upon control of the vertical descent of the aircraft and it is assumed that during such flight to accomplish actual touchdown, the aircraft is directed on the correct heading or substantially correct heading to effect a proper landing under the conditions imposed by each particular situation. The present disclosure is therefore confined to the considerations implicit in the control of vertical descent of the aircraft.

Apparatus operating in accordance with the present invention senses vertical velocity of the aircraft and compares that velocity with an initial rate of descent command signal to produce a differential output indicative of the craft's deviation from the desired initial rate of descent; a highly accurate measure of the absolute altitude of the aircraft above the terrain is continuously made and at a selectable predetermined value of absolute altitude signal, a switch means is actuated to disconnect the first or initial command signal from the comparison means and impress a second or final rate of descent command signal upon the comparison means so that the output of the comparison means is thereafter indicative of the aircraft's deviation from the final rate of descent command signal. The second or final rate of descent command signal is chosen so as to be safe for craft touchdown and is usually considerably less than the initial rate of descent command signal.

The present invention therefore contemplates the use of the actual vertical velocity or rate of change of altitude signal to be successively compared with two different and distinct rate of descent command signals, and effecting changeover from comparison with the first command signal to comparison with the second command signal by use of an absolute altitude signal at a selectable predetermined value. The desired rate of descent is therefore only secondarily governed by absolute altitude of the aircraft above the terrain and the output of apparatus operating in accordance with the present invention represents deviation of the vertical flight of the aircraft from a two-part flight path, the first portion of which is chosen to effect efficient let-down of the aircraft in smooth continuity from an approach such as a glide path pattern, and the second portion of which is chosen to afford positive touchdown of the aircraft without damage or undue shock.

Other means and methods of landing aircraft by an instrument landing system have been devised and one such scheme is disclosed in a copending application Serial No. 266,456, filed January 15, 1952, by Percy Halpert and George F. Jude. The invention disclosed therein is designed to afford an asymptotic or exponential type of flare-out course of vertical flight and compares an altitude signal with a rate of change of altitude signal to produce a differential signal representative of deviation of the aircraft from the desired flight path. In that system a continuously changing rate of descent is sought to be achieved and while such a flight path is desirable for many applications, a constant error in the altitude signal fed into the comparison means will produce a continuous error in the output of the comparison means.

Contrasted to that type of system, apparatus operating in accordance with the teachings of the present invention employs an absolute altitude signal only to effect switching operations so that an error in the absolute altitude signal causes only a momentary error in the limited sense that the changeover from the initial rate of descent to the final rate of descent is accomplished at a very slightly different instant of time from that which might be considered ideally perfect. Moreover, the predetermined final rate of descent remains the same regardless of such error and assures a positive though very small vertical velocity of the aircraft under all conditions so that "floating" above the landing area is eliminated if the aircraft is flown in conformity with the preselected flight pattern.

These and other objects of the present invention will become more apparent from the following description and from the accompanying drawings illustrating the features of the present invention.

In the drawings,

Fig. 4 is a schematic block diagram of another embodiment of the present invention used in conjunction with a glide path receiver; and Figs. 5 and 5a constitute a schematic wiring diagram of an embodiment of the present invention.

In the development of aircraft instrumentation and automatic control systems efforts have long been made to provide reliable means by which an aircraft may be safely landed in completely closed-in weather conditions. Such developments are usually initiated by the conception of a predetermined flight pattern to be executed during the landing operation. One such flight pattern having a substantially asymptotic or exponential character is disclosed in the copending application Serial No. 266,456 previously alluded to herein. The present invention is conceived upon the premise that a final rate of descent culminating in actual touchdown of the aircraft should have a relatively small but nonetheless finite and constant vertical velocity component. This is in contrast to the concept disclosed in the copending application referred to wherein the actual rate of descent may be virtually zero as the aircraft reaches the end of its asymptotic flight path because of the fact that the rate of descent in that system is continuously and progressively lessened as the aircraft descends.

The present invention contemplates a system which completes the transition from an outlying approach such as a glide path, for instance, to the actual landing. It is with that over-all object in mind that the present invention conceives an intermediate flight path between the GCA or glide path approach and the final rate of descent. Thus, a two-part flight pattern has been established to effect the transitionary course of the aircraft.

At a first pre-established altitude the guidance of the craft by glide path signal is terminated and the initial portion of the two-part flight course is begun. At a second pre-established altitude the final portion of the two-part flight course is begun in accordance with the desired final safe rate of descent to touchdown.

To effect the proper operation of apparatus in accordance with the present invention a highly precise and very accurate low-level altimeter is employed. This altimeter does not contribute directly to the generation of either the initial rate of descent signal nor the final rate of descent signal, but is used solely for switching operations. A high-precision, low-level altimeter suitable for use in apparatus embodying the present invention, has been disclosed in the National Bureau of Standards' Technical News Bulletin, volume 38, No. 3, published March 1954. This is an X-band, frequency modulated altimeter which will produce highly accurate readings of absolute altitude above the terrain down to an altitude of two feet. Other altimeters may be employed, however, if they possess the requisite characteristics of low-level accuracy and preferably should be of the type which produces a measure of absolute altitude above the immediate terrain. A number of suitable types of such altimeters are known to exist in the art in practical and workable forms.

Figure 1:
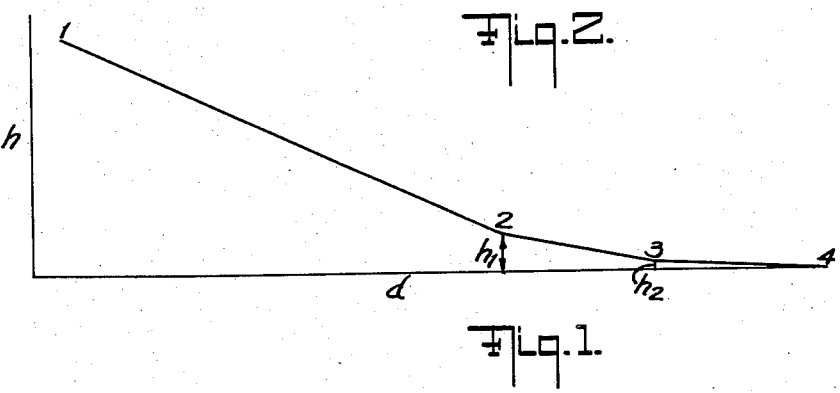
Fig. 1 is a diagram of one type of two-part vertical flight path which may be effected through use of the present invention.

Referring now to Fig. 1, it may be seen that the glide path and two-part landing flight pattern or flare-out pattern is illustrated on a scale representing the altitude $h$ in its ordinate and distance $d$ along the abscissa. The path 1—2 may be considered to be the approach flight course followed by an aircraft as guided by glide path means and localizer, for instance. The path 2—3 is the first or initial portion of the desired course of flight in the landing pattern and is effected at a preselected absolute altitude $h_1$ above the terrain. The path 3—4 is the second or final portion of the desired flight course and is effected at the predselected absolute altitude $h_2$ above the terrain.

In Fig. 1 the initial portion of the desired flight pattern is shown as having a different rate of descent than the glide path approach. In many cases it may be desirable to command an initial rate of descent which is substantially the same as that of the glide path so as to effect the transition from one control to the other with smooth continuity. The illustrated flight paths are therefore intended only to facilitate the disclosure and explanation of the operation of the invention and are not limiting in any sense upon the rate of descent which may be effected through use of the present invention.

The present invention is conceived so as to afford selection of rates of descent for each of the two parts of the desired flight course and to produce a measure of deviation from the desired course. This measure of deviation may be used to actuate an appropriate indicator such as a cross-pointer meter or it may be used to direct the aircraft to the desired flight course by automatic pilot means of conventional type.

Figure 2:
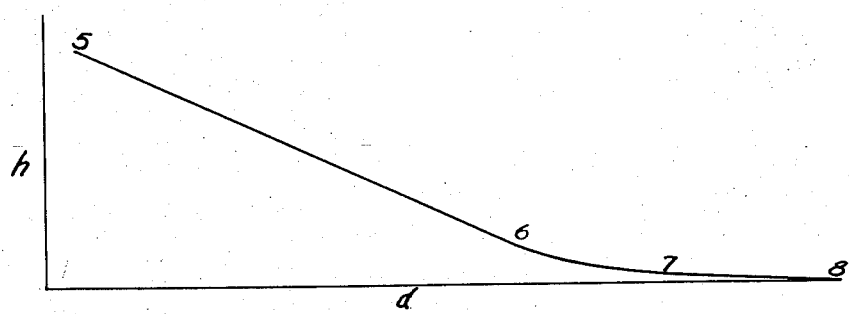
Fig. 2 is a diagram of another type of two-part vertical flight path which may be effected through use of the present invention.

Fig. 2 illustrates an approach course 5—6 and a final rate of descent pattern 7—8 much the same as that shown in Fig. 1. The initial portion 6—7 of this preselected landing pattern is shown as being curvilinear. This portion of the flight path may be substantially exponential or asymptotic in form and may be effected by means similar to the apparatus disclosed in copending application Serial No. 266,456. For some uses it may be preferable to have a portion of the flight path take a curvilinear form, while for other uses the curvilinear portion of flight may be so short as to render it a needless complication of the system from a practical point of view. This will largely depend upon the flight characteristics of the aircraft and other pertinent factors.

Figure 3:
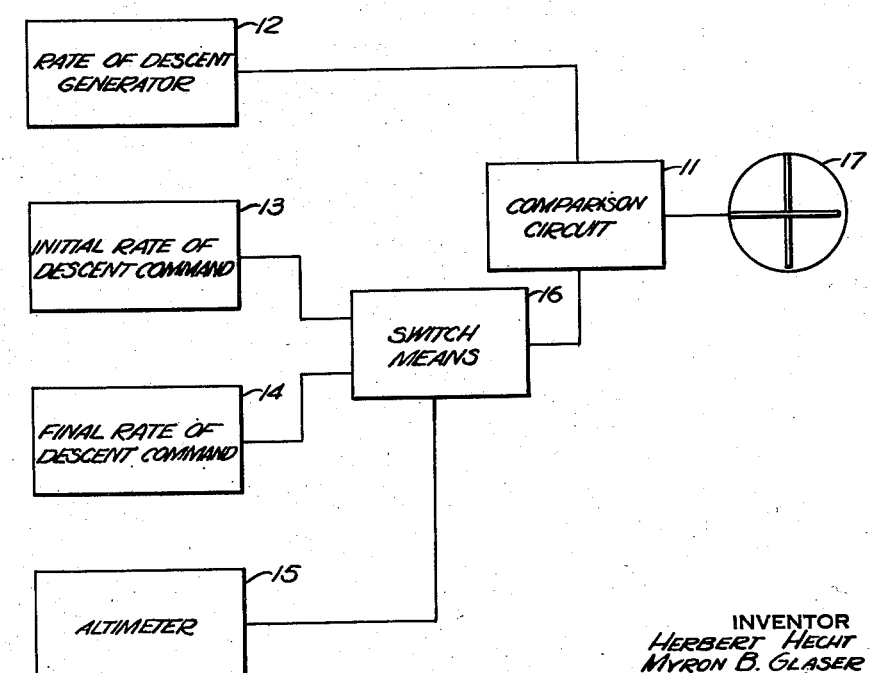
Fig. 3 is a schematic block diagram of the basic components employed in an embodiment of the present invention.

Fig. 3 is a schematic block diagram of the major components of an embodiment of the present invention. A comparison circuit 11 is connected to receive two inputs and produce a signal as a measure of the difference therebetween. One of the inputs is in the form of a rate of change of altitude signal generated by a rate of descent generator 12. The second input to the comparison circuit 11 is furnished either by an initial rate of descent command source 13 or a final rate of descent command source 14. The latter two sources are connected to or disconnected from comparison circuit 11 through a switch means 16 which is actuated in response to discrete preselected values of absolute altitude signals generated by a low-level, high precision altimeter 15.

The two command signals are selected in proportion to the calculable output of the rate of descent generator 12 for known rates of descent so as to be respectively representative of the desired two-part landing pattern. At a preselected altitude, which in actual operation may be eighty feet as sensed by altimeter 15, the switch means 16 connects the output of initial rate of descent command 13 to the deviation indicator 17. The differential output of comparison circuit 11, which in this embodiment is shown to actuate a cross-pointer meter, is a measure of the deviation of the flight of the craft from the desired rate of descent, which in a typical instance may be from 350 to 450 feet per minute. As the craft descends, at another preselected altitude which may be fifteen feet, for example, as sensed by the altimeter 15, the switch means 16 is actuated to disconnect the initial command rate of descent 13 from the comparison circuit 11 and connect the final command rate of descent 14 to the comparison circuit. The output of the comparison means then is a measure of the deviation of the craft from the final rate of descent which it is desired that the aircraft maintain until touchdown. The final command rate of descent may be of the order of 100 feet per minute. The choice of the desired rates of descent and switching altitudes will vary of course with different types of aircraft, airspeeds and other pertinent conditions.

Fig. 4 illustrates an embodiment of the present invention used in conjunction with a glide path receiver. A barometric altimeter 20 furnishes an altitude signal which is continuous and substantially noise-free. If the altimeter 20 has a limited range of reliable operation, it may be desirable to leave it unconnected until the aircraft reaches an appropriate altitude within its accurate range such as approximately one hundred feet. Upon reaching an altitude of one hundred feet, the output of a radio altimeter 21 of the high precision, low-level type operates upon control circuit 22 to actuate a switch means 23 connecting the output signal of the barometric altimeter 20 to a rate generator.

The output signal of a vertical accelerometer 25 may be mixed or added to the rate of change of altitude signal produced by rate generator 24. The vertical acceleration signal may be integrated, partially integrated, or modified in a manner which will be explained more fully hereinafter in connection with specific circuitry yet to be described. A mixing circuit 26 compounds the two signals to produce a composite signal representative of the rate of change of altitude of the craft including sudden accelerations.

The rate signal is fed to a comparison circuit 27. The signal with which it is compared is derived from an initial command rate of descent source 28 connected to the comparison circuit 27 by a switch 29 actuated by radio altimeter 21 through control circuit 22. The differential output of comparison circuit 27 is therefore a function of the deviation of the aircraft from that portion of a desired flight pattern defined by the initial command rate of descent.

However, the cross-pointer indicator 30 is connected to receive input signals from a glide path receiver 31 until an altitude of approximately eighty feet is reached. That altitude is sensed by radio altimeter 21 and control circuit 22 is rendered operative to actuate a switch means 32 thereby disconnecting the cross-pointer meter 30 from the glide path receiver 31 and connecting the cross-pointer meter 30 to receive the output of comparison circuit 27 so that the cross-pointer 30 thereafter indicates the craft's deviation from the command rate of descent rather than deviation from the glide path as it had previously.

When the aircraft reaches a height of approximately fifteen feet above the terrain, the control circuit 22 is again rendered operative and actuates switch means 29. The final command rate of descent, as derived from source 33, is then impressed upon the comparison circuit 27 in place of the initial command rate of descent, and the cross-pointer meter 30 indicates the craft's deviation from the desired final rate of descent. The switching devices 23, 32 and 29 have letter designations *a*, *b* and *c*, respectively, to indicate their normal chronological order of operation.

As shown in Fig. 4 an appropriate arrangement may be connected to the output of comparison circuit 27 for controlling the flight of the aircraft automatically through a coupling circuit 34 and the elevation portion of an automatic pilot means 35. The output of comparison circuit 27, representing a measure of the deviation of the craft from the vertical flight path, is employed as an error signal and impressed upon the automatic pilot means to correct such deviation so that the flight of the craft conforms to the preselected flight path.

Figure 5A:
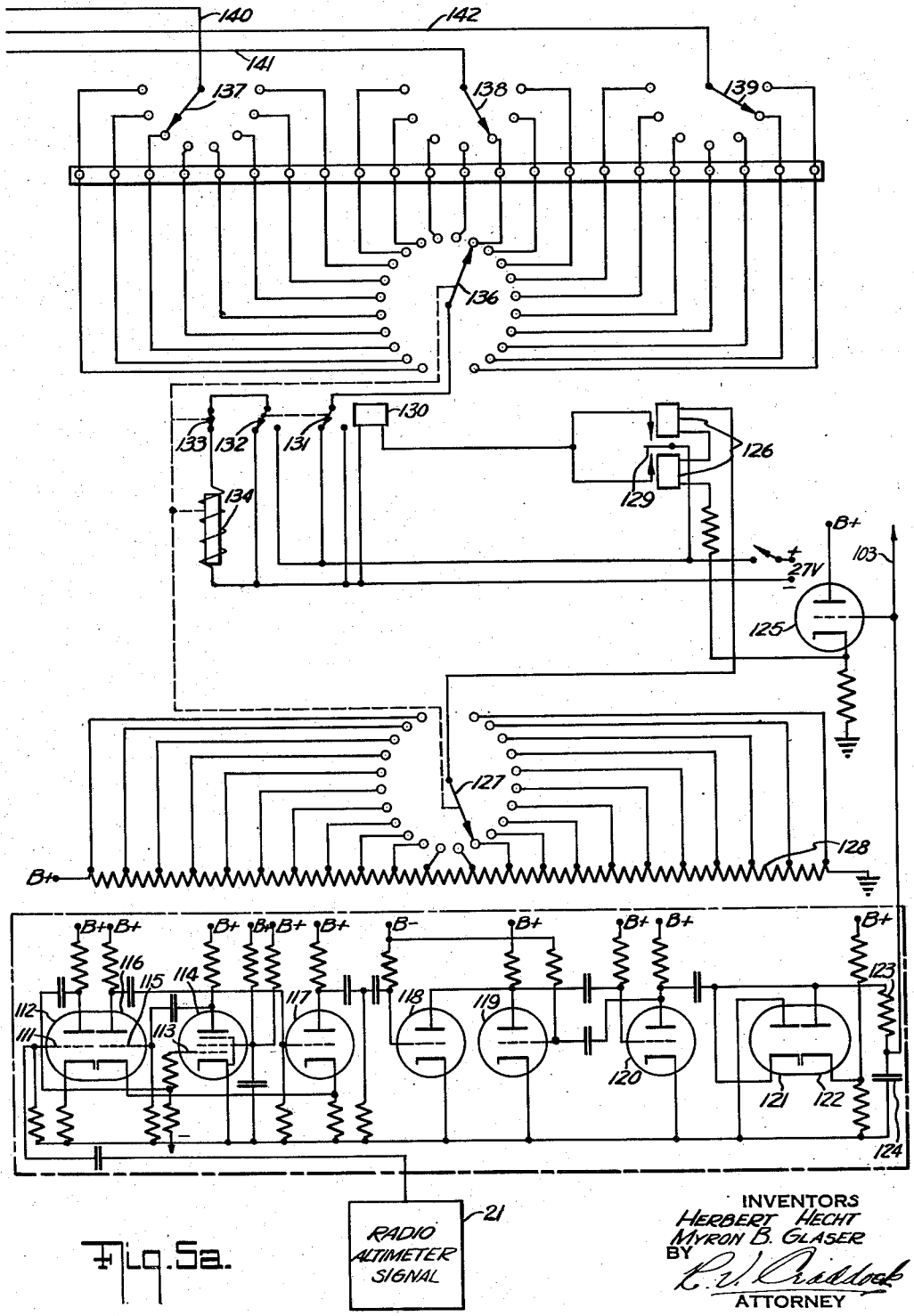

Figs. 5 and 5a together comprise a detailed schematic wiring diagram of a typical embodiment of the present invention. In this embodiment suitable sources of barometric altitude signal, vertical acceleration signal, and high-precision low-altitude signal such as those previously described are assumed to be available to provide proper operation in accordance with the invention. Command signals are furnished from a known and fixed potential source.

The barometric altimeter signal is fed from a source 20 through a relay-actuated switch 23 to the primary winding 212 of a transformer. The secondary winding 214 of the transformer 213 is center-tapped to provide push-pull signals to the grids 215 and 216 of two triode amplifiers 217 and 218, respectively, arranged and connected in a push-pull stage having a common cathode circuit.

The ends of secondary winding 214 are respectively connected through resistors 210 and 211 to ground. Variable taps on resistors 210 and 211 are respectively connected to grids 215 and 216. The adjustment of the variable taps on resistors 210 and 211 provide a sensitivity control.

The sum output of the plate circuits of amplifiers 217 and 218 is developed across the primary winding 219 of a coupling transformer 220. The secondary winding 221 of the coupling transformer 220 is center-tapped at 222 and develops push-pull signals in response to the input impressed upon its primary winding 219.

The grids 223 and 224 of two triodes 225 and 226, respectively are connected to receive the push-pull signals so developed and they cooperatively function as a phase-detector stage. Electron tubes 225 and 226 have the same alternating current reference signal derived from a source 227 impressed upon both their plate-cathode circuits. The reference signal thus provided is related to the input signals of phase detectors 225 and 226 through the center-tap of a transformer 228 which is connected to the center-tap of transformer 220.

The output of the phase detector stage comprised of tubes 225 and 226 is substantially half-wave rectified alternating current having an amplitude proportional to the magnitude of the voltage across secondary winding 221 and a polarity determined by the relative phase between said input and plate potentials. This output is smoothed by a filter comprised of an inductance 235 and capacitors 229, 230 and 231. An RC rate network comprised of a capacitor 232 and a resistor 233 differentiates the smoothed signal which is proportional to the altitude as sensed by the barometric altimeter and produces a signal proportional to the rate of change of altitude with respect to time. The rate signal thus produced is mixed at junction 234 with an acceleration signal, the origin and development of which will now be explained.

A source 40 supplies a pentode amplifier 41 with an acceleration signal which varies in sense and amplitude in response to the direction and amplitude of the rate of change of vertical velocity of the craft. The plate output of pentode 41 is applied to the grid 42 of a triode amplifier 43 which has its plate connected in circuit with the primary winding 44 of an interstage transformer 45. Through a triode 46, operating in the manner of a cathode-follower, a selectably adjustable amount of feedback is impressed upon the pentode stage 41 to control the gain of the accelerometer signal. The grid 47 of triode 46 has the plate output of triode 43 impressed upon it. A variable tap resistor 48 serially connected in the cathode circuit of triode 46 and having its movable contact 49 connected to the cathode 50 of pentode 41 affords a means of adjusting the proportion of feedback voltage applied and thereby controlling gain.

The secondary winding 51 of the interstage transformer 45 is center-tapped at 52 and develops a push-pull signal which is impressed across a full-wave, phase-sensitive demodulator or rectifier comprised of two duo-triodes 53 and 54. The plate of one triode in each envelope and the cathode of the other triode in each tube envelope are paired and commonly connected to opposite output terminals of the secondary winding 51 of transformer 45. The remaining plates 60 and 61 and cathodes 59 and 62 of the tubes 53 and 54 are connected in common to each other. Two pairs of triodes are thus connected in opposite polarity cascade fashion across the push-pull output of the coupling transformer 45.

The grid-cathode circuit of each triode has an alternating current reference signal of the same frequency impressed upon it. The reference signal may be obtained from a source such as 227, the same source supplying transformer 228, which supplies an alternating current signal to the phase-detecting stage of the barometric altimeter signal channel or any similar suitable source. The grid-cathode circuits are arranged and connected to include individual secondary windings 63, 64, 65 and 66 which are inductively coupled to receive the reference signal from the single primary winding 67 of a transformer 68. Winding 67 is connected to source 227. This over-all arrangement of circuits thus operates to provide a full-wave rectified output of a polarity and amplitude dependent upon the phase and amplitude of the input impressed upon the plate-cathode circuits as related to the reference signals upon the grid-cathode circuits of the triodes.

The rectified output is smoothed by a filter comprised of capacitors 68 and 69, and inductor 70. An RC network is connected to receive the output signal of the phase-sensitive rectifier stage and is comprised of a resistor 71 and capacitor 72 of appropriate values to partially integrate the vertical acceleration signal which is mixed with the rate of change of altitude signal at junction 234 as has been previously mentioned.

The combined signal is fed from junction 234 to the grid 81 of a triode 83 which is one-half of a comparison circuit. An appropriate value of negative bias may be selected by adjustment of the variable tap 273 of the potentiometer 274 which is connected across a B— source. The other half of the comparison circuit consists of a triode 82 having its grid 80 connected to receive a command rate of descent signal representative of a desired rate of descent of the craft commensurate with a preselected flight path. The cathodes 84 and 85 of triodes 82 and 83 are connected to a common B— source through resistors 86 and 87 respectively. There is therefore developed across the cathode resistors 86 and 87 a potential having an amplitude proportional to the difference in the input signals to the two triodes 82 and 83, and of a polarity dependent upon which of the tubes is conducting more than the other. This polarized output may be applied through a relay-actuated switch 32 to the normally horizontal pointer of a cross-pointer visual indicator instrument such as that schematically shown at 89, or applied as a correction signal to actuate the vertical control channel of an automatic pilot device as will be more fully explained hereinafter.

The initial command rate of descent signal may be derived from a voltage divider comprised of two resistors 90 and 91 serially connected to a stable direct current source such as B+. An appropriate potential is tapped and connected to the input of the comparison circuit through a relay-actuated switch 29 and through a manually operated switch 92. A final command rate of descent signal may be derived by tapping a lesser potential such as ground, for instance, which is connected to the comparison circuit input when relay-actuated switch 29 is in its lower position.

The potential thus tapped is, when switch 92 is in its down position, connected to a limiter circuit comprising diodes 93 and 97 in one envelope, resistor 102, and potentiometers 96 and 101. The function of the limiter is to provide voltages of appropriate amplitude to the grid 80 of the tube 82 of the comparison circuit so as to represent the discrete rates of descent in accordance with the predetermined flight path. The command rate of descent signal is compared with the rate of change of altitude signal which is impressed upon the grid 81 of the tube 83 which comprises the other side of the comparison circuit.

The diode 93 limits the minimum output of this circuit to the value of voltage at which its conduction begins and determines the final rate of descent command to be applied to grid 80 of triode 82 in the comparison circuit. This is determined by the position of variable tap 95 on potentiometer 96, which establishes a selectable positive potential on the plate 94 of diode 93. Potentiometer 96 forms part of a voltage divider connected between ground level and B+. Variable tap 95 is ganged with both variable taps on resistors 210 and 211 controlling the push-pull inputs to grids 215 and 216 of the amplifier stage comprised of triodes 217 and 218 in the barometric altitude signal channel. This control is necessary to provide a properly calibrated voltage calling for the correct final rate of descent which is independent of the sensitivity control in the barometric altitude signal channel.

A second diode 97 has its plate 98 connected to the command signal grid input of triode 82. The cathode 99 of diode 97 is connected to the variable tap 100 of a potentiometer 101 which is in turn connected to B+. By selectably adjusting the value of bias so impressed upon the cathode 99 of diode 97, the initial rate of descent command signal may be established for varying combinations of approach airspeed and barometric altitude signal channel sensitivities. The diode 97 thus limits the maximum output of this circuit to the value of voltage at which its conduction begins.

Thus far the description and explanation of the operation of the embodiment shown in Fig. 5 has been concerned with the sources and generating of the actual rate of descent signal and its comparison with a chosen command rate of descent signal.

In normal operation, however, two command rate of descent signals are sequentially impressed upon the comparison circuit. These and other operative functions of the apparatus are effected in response to the actual altitude of the aircraft above the terrain. In this embodiment, the origin of the signal which controls these sequential switching operations is a high-precision low-altitude radio altimeter and those switching operations will now be described and explained.

Reference is now made to Fig. 5a which illustrates the remaining portion of this embodiment of the invention. A highly accurate altitude signal is supplied by a source 21 to the grid 111 of an amplifier triode 112 in the form of an alternating current voltage whose frequency is proportional to altitude. The plate output of triode 112 is impressed upon the control grid 113 of a pentode 114 which in turn supplies its output to the grid 115 of triode 116, which with triode 117 form a cathode coupled multivibrator. The pulse output of the plate of triode 117 is passed through an RC pulse shaping network which differentiates the waveshape. Triode 118 is a pulse amplifier and produces at its plate a large negative triggering pulse to operate the single shot multivibrator consisting of triodes 119 and 120. The output of triode 120 is a series of positive pulses of uniform width whose repetition rate is the same as the frequency of the altimeter signal. Diode 122 rectifies the positive pulses and passes them through an RC filter which produces a direct current output proportional to the frequency of the uniform pulses. Diode 121 blocks negative going waveshapes from succeeding circuits. In this particular embodiment an output was produced of approximately 0.75 volt per foot of altitude as measured by the radio altimeter 21.

The direct current output, representative of absolute altitude above the terrain, is connected to a cathode follower 125 for impedance isolation. The output of the cathode follower is connected through a resistor to relay 126. The relay 126 is connected at its remaining terminal to a source of direct current potential so that when there is a difference between these two potentials, a current is caused to flow through the coils of relay 126.

This direct current potential is derived from a movable tap 127 which is disposed so as to be rotatably connectable with each of a plurality of contacts. Each of the contacts is in turn connected to a different value of potential as realized from the taps of a voltage divider 128 connected from B+ to ground.

A sufficient difference in potential between the output of the absolute altitude channel and the potential impressed upon tap 127 will cause enough current to flow so as to actuate switch 129. When the contacts of switch 129 are closed, relay coil 130 has 27 volts impressed upon it and the resulting current flowing therethrough closes ganged switches 131 and 132. Closure of switch 132 causes current to flow through solenoid coil 134, actuating a plunger to advance a stepping switch. Normally closed contact 133 is opened when the solenoid plunger is operated, so that the switch advances only one step for each operation.

The variable tap 127 is operatively linked to the stepping switch so that upon actuation of the latter, the variable tap 127 is moved to the next adjacent tap of the plurality of potential taps. This results in a different potential value being applied to one end of relay coils 126, and the apparatus is so designed that there will be insufficient immediate difference between the newly tapped value of potential and the output of the absolute altitude channel to actuate switch 129. However, as the value of the absolute altitude channel changes, an increasingly larger difference potential exists between it and the tapped potential, and when sufficient current is caused to flow through coils 126, the progressive stepping cycle previously described is repeated.

From this sequence of operations, it may be seen that the variable tap is positioned to tap a value of potential proportional to absolute altitude. The signal realized from the absolute altitude channel is compared to the tapped potential and as the altitude of the craft changes, the stepping switch is actuated, one function of which is to tap a new value of potential consistent with the newly attained altitude of the craft.

The stepping switch operation is ganged to operate the variable tap 136 of another bank of contacts which are disposed so as to be connectable with the variable tap 136.

It may be seen that as variable tap 136 is progressively stepped from one of the plurality of fixed contacts to the next, its position is representative of the altitude of the craft. Thus each of the plurality of fixed contacts connectable to variable tap 136, may be supplied with a signal such as the 27 volts direct current impressed upon variable tap 136 through switch 131. Such signal is impressed upon the fixed contact representative of the instantaneous altitude of the aircraft. The plurality of fixed contacts may therefore be connected to devices which must function at particular altitudes. Arranging a plurality of these adjacent fixed contacts to be selectably connected to one device through a rotatable contact arm such as that shown at 137 affords a means of actuating any device operatively connected to the rotatable contact arm 137 at any one of the eight different altitudes represented by the eight fixed contacts with which arm 137 is selectably connectable. When the stepping switch reaches the contact with which rotatable contact 137 is aligned, the potential of 27 volts (or any other suitable potential) is transmitted to the device to be actuated.

In similar manner, adjustable taps 138 and 139 are arranged to receive an actuation signal at any one of a number of different altitudes within discrete known ranges. The selected positions of taps 138 and 139 determines the particular altitude at which each receives a 27 volt signal. Thus variable taps 137, 138 and 139 sequentially receive a potential which may be used to actuate relays or similar devices at known, selectable altitudes and in sequence responsive to the changing absolute altitude of the aircraft above the terrain.

In the embodiment of Figs. 5 and 5a, taps 137, 138 and 139 are connected to leads 140, 141 and 142 respectively. These leads are connected to operate relays controlling switches 23, 32 and 29. Since this apparatus normally functions as the aircraft descends, the stepping switch operation in response to changing altitude will rotate the movable contacts 127 and 136 in a clockwise direction. Relay-operated switch 23 is the first to be actuated, relay-operated switch 32 is the second to be actuated, and relay-operated switch 29 is the third and last to be actuated.

Recalling that the over-all purpose of the apparatus is to effect guidance of an aircraft in that portion of the landing operation from a glide slope approach to touchdown, the cooperative actuation of the above-mentioned relay-actuated switches as related to the operation of the remainder of the system will become more apparent. Switch 23 is the first to be closed, connecting the barometric altitude signal source to the amplifying and detection channel which produces the rate of change of altitude signal impressed upon one of two input circuits of the comparison means. The source of barometric altitude signal in this embodiment has a limited physical range of travel corresponding to 150 feet of altitude. Movable contact 137 should be positioned to close switch 23 at approximately 100 feet absolute altitude above the actual terrain and thus furnish an input rate of change of altitude signal to the comparison circuit at all lesser altitudes.

Switch 32 is disposed so as to connect either the output signal of a glide path receiver or the output of the comparison circuit to cross-pointer meter 89. Normally, before the final phase of the landing operation, the switch 32 is in its upper position as shown. Movable contact 138 is positioned so as to actuate switch 32 at about 80 feet of absolute altitude above the actual terrain. From that altitude to actual touchdown of the aircraft, the cross-pointer meter 89 receives a signal which is indicative of the aircraft's deviation from a preselected rate of descent as determined by a command signal.

The source of the command rate of descent signals is a voltage divider comprised of resistors 90 and 91 connected to B+. Relay-actuated switch 92 is arranged to be connected to either the potential which is developed across resistor 91, as a first command signal to be modified by the limiter 97 and impressed upon the grid 80 of the comparison circuit, or in its other position to be connected to ground as a second command signal to be modified by limiter diode 93.

The value of the first command signal is such that, together with the established parameters of the remainder of the system, will define a desired initial rate of descent of a two-part flight pattern such as has been described in connection with Figs. 1 and 2. The switch is thus initially in its upper position as shown. The initial command signal is compared with the actual rate of descent to provide the appropriate actuation of cross-pointer meter from approximately 80 feet of altitude, when switch 32 is actuated, until an absolute altitude of the order of fifteen feet above the terrain. At this altitude, movable contact 139 is connected to an actuation potential as a result of the progressive stepping of rotatable arm 136 in response to altitude changes. The actuation signal, which in this instance is shown as being a 27 volt source of direct current, causes switch 29 to be connected to ground as the source of the second command signal developed by the limiter 93.

The output of the comparison circuit which operates the cross-pointer meter 89 then becomes the difference between the second command signal and the actual rate of descent of the aircraft. The second command signal defines a rate of descent commensurate with the second part of the two-part flight patterns illustrated in Figs. 1 and 2. This final rate of descent is maintained until touchdown of the aircraft, at which point the landing operation is completed.

The theory and basis of operation of the apparatus of Figs. 5 and 5a having been explained in detail as to the origin and formation of signals as well as their sequential control and utilization, the possibility of modifications and variations within the scope of the invention becomes more apparent.

Fig. 2 shows a two-part flight pattern for landing in which the initial portion 6—7 is curvilinear and may be substantially asymptotic, to a line crossing the runway substantially at the touch-down point and extending downwardly therefrom in the direction of flight and at a slight angle to the runway. One method for effecting such a flight path, if desired, is to utilize a comparison circuit which compares absolute altitude to the rate of change of altitude to produce an output signal proportional to a continuously lesser desired rate of descent as the aircraft approaches touchdown. Such an arrangement is disclosed in copending application Serial No. 266,456 referred to hereinbefore. The substitution of the method and apparatus of comparing signals as disclosed therein by Halpert et al. will effect a curvilinear first portion of the landing pattern. With suitable switching provision for reverting to the operation as disclosed herein for the second portion of the landing pattern, the advantage is preserved of having a safe final rate of descent which nonetheless assures positive touchdown eliminating "floating" above the runway. The switching operations would be effected in response to the sequential control had from a continuous measure of absolute altitude above the terrain in accordance with the teaching of the present invention.

It is further within the purview of this invention to have a greater number of straight, or substantially straight portions, in the landing pattern than are shown in Fig. 1. Such a multi-path pattern also results in an approach which is asymptotic to a line having a slight angle downward toward the runway and which prevents "floating."

The use of switch 92 in Fig. 5 permits a flare-out approach with a minimum rate of descent at the end thereof and without using an altitude controlled switch such as 29. When the switch 92 is manually placed in its upper position, it no longer connects either of the two command rate of descent signals through the limiter circuit to the grid 80 of tube 82 in the comparison circuit. With switch 92 in its upper position, the end of resistor 102 remote from diodes 93 and 97 is connected through wire 103 to the junction of resistor 123 and condenser 124 in Fig. 5a. In this condition when the voltage from the radio altimeter circuit is higher than a certain magnitude, as determined by the adjustment of resistor 101, diode 97 conducts and limits the maximum voltage applied to tube 82 which is the command rate of descent signal.

As the output voltage of the radio altimeter decreases with the decreasing altitude of the aircraft, a point is reached where tube 98 does not conduct and the ever decreasing voltage applied to the grid of tube 82 calls for an ever decreasing rate of descent. This continuously decreasing command rate of descent, if followed by the aircraft, results in an exponential flare-out of the approach pattern. However, when the voltage from the radio altimeter circuit reaches a sufficiently low magnitude as determined by the setting of variable tap 95, diode 93 begins to conduct and limits the lowest voltage applied to tube 82 of the comparison circuit and hence limits the minimum command rate of descent. This operation insures that the aircraft, if the command rate of descent is followed, will reach the runway with a small but positive rate of descent and not "float" above it.

A system for completely automatic landing may be effected by connecting the output of the comparison circuit developed across resistors 86 and 87 to the elevation control channel of an automatic pilot means 150. As shown in Fig. 5, the cross-pointer meter 89 is also connected to the same output signal so that a visual indication may be used as a check on the operation of the automatic pilot as it progressively corrects the aircraft's deviation from the desired flight path.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for guiding an aircraft including, means for generating a signal substantially proportional to the rate of change of altitude of said aircraft, comparison means connected to receive said rate signal, a first command signal, a second command signal, means for generating a signal as a function of the altitude of said aircraft, and means responsive to first and second predetermined values of said altitude signal for sequentially impressing said first and second command signals upon said comparison means, whereby the output of said comparison means is a measure of the instantaneous deviation of said aircraft from a two-part flight path in accordance with said first and second command signals.

2. Apparatus for guiding an aircraft through a flare-out landing pattern including means for generating a first signal substantially proportional to the actual rate of change of altitude of said aircraft, comparison means connected to receive said first signal, means for generating an altitude signal indicative of the altitude of said aircraft above the ground, means controlled by said altitude signal for generating a second signal indicative of a desired rate of descent, means for limiting said second signal to a preselected minimum amount, means for applying said second signal as affected by said limiting means to said comparison means.

3. Apparatus for guiding an aircraft through a flare-out landing pattern including means for generating a first signal substantially proportional to the actual rate of change of altitude of said aircraft, comparison means connected to receive said first signal, means for generating an altitude signal indicative of the altitude of said aircraft above the ground, means controlled by said altitude signal for generating a command rate of descent signal, means for restricting said command rate of change signal within preselected maximum and minimum magnitudes to provide a command rate of descent signal restricted within a certain range, means for applying said restricted command rate of descent signal to said comparison means.

4. Apparatus for guiding an aircraft through a flareout landing pattern including means for generating a first signal substantially proportional to the actual rate of change of altitude of said aircraft, comparison means connected to receive said first signal, means for generating an altitude signal indicative of the altitude of said aircraft above the ground, means controlled by said altitude signal for generating a rate of change of descent signal which is a function of said altitude, means effective at a certain preselected altitude to limit said command rate of descent signal to a preselected minimum, means for applying said limited rate of descent signal to said comparison means.

5. Means for guiding an aircraft including, means for generating a signal substantially proportional to the rate of change of altitude of said aircraft, comparison means connected to receive said rate signal, a first command signal, a second command signal, means for generating a signal as a function of the altitude of said aircraft, and switch means responsive to first and second predetermined values of said altitude signal for sequentially impressing said first and second command signals upon said comparison means, whereby the output of said comparison means is a measure of the instantaneous deviation of said aircraft from a two-part flight path in accordance with said first and second command signals.

6. Means for guiding an aircraft including, means for generating a signal substantially proportional to the rate of change of altitude of said aircraft, comparison means connected to receive said rate signal, first and second command signals representative of first and second desired rates of descent of said aircraft, means for generating a signal proportional to the altitude of said aircraft, and switch means responsive to two different predetermined values of said altitude signal for sequentially impressing said first and second command signals upon said comparison means, whereby the output of said comparison means is a measure of the instantaneous deviation of said aircraft from a two-part flight path comprised of said first and second desired rates of descent of said aircraft.

7. Means for guiding an aircraft including, first altitude responsive means for generating a signal proportional to the altitude of said aircraft, means connected to receive said altitude signal for generating a signal correlated to the rate of change of altitude of said aircraft, comparison means connected to receive said rate signal, first and second discrete command signals, second altitude responsive means for producing a signal proportional to the absolute altitude of said aircraft above the terrain, and switch means responsive to first and second predetermined values of said absolute altitude signal for sequentially impressing said first and second command signals upon said comparison means, whereby the output of said comparison means is a measure of the instantaneous deviation of said aircraft from a two-part flight path determined by said first and second command signals.

8. Means for guiding an aircraft including, means for generating a signal in response to the rate of change of altitude of said aircraft, means for modifying said rate signal by a function of vertical acceleration of the aircraft, comparison means connected to receive said modified rate signal, first and second discrete command signals, means for generating a signal as a function of the absolute altitude of said aircraft above the terrain, and switch means responsive to first and second predetermined values of said absolute altitude signal for sequentially impressing said first and second command signals upon said comparison means, whereby the output of said comparison means is a measure of the instantaneous deviation of said aircraft from a two-part flight path determined by said first and second command signals.

9. Means for guiding an aircraft including means for generating a signal representative of the rate of change of altitude of the aircraft, a first command signal, comparison means connected to receive said rate signal and said first command signal for producing an output correlated to the difference therebetween, a second command signal, means for generating a signal dependent upon the absolute altitude of said aircraft above the terrain, and switch means responsive to a predetermined value of said absolute altitude signal for disconnecting said first command signal from said comparison means and impressing said second command signal upon said comparison means, whereby the output of said comparison means is a measure of the instantaneous deviation of said aircraft from a two-part flight path determined by said first and second command signals.

10. Means for automatically landing an aircraft including means for generating a signal substantially proportional to the rate of descent of said aircraft, a first command signal commensurate with a desired initial rate of descent, comparison means connected to receive said rate signal and said first command signal for producing an output dependent upon the difference therebetween, a second command signal commensurate with a desired final rate of descent, means for generating a signal as a function of the absolute altitude of said aircraft above the terrain, switch means responsive to a determinable value of said absolute altitude signal for disconnecting said initial command signal from said comparison means and impressing said final command signal upon said comparison means, and automatic pilot means connected to receive the output of said comparison means, whereby the aircraft is caused to descend in a flight path having discrete portions of different rates of descent in accordance with said initial and final command signals which are changed at a preselected absolute altitude above the terrain.

11. Means for automatically landing an aircraft including receiver means for producing a signal proportional to the deviation of the aircraft from a predetermined glide path, automatic pilot means connected to receive the output of said receiver means, means for generating a signal substantially proportional to the rate of descent of said aircraft, a first command signal commensurate with a desired initial rate of descent, comparison means connected to receive said rate signal and said first command signal for producing an output dependent upon the difference therebetween, a second command signal commensurate with a final rate of descent, means for generating a signal as a function of the absolute altitude of said aircraft above the terrain, means responsive to a first value of absolute altitude signal for disconnecting said automatic pilot from said receiver and impressing the output of said comparison means thereon, said means being responsive to a second value of absolute altitude signal for disconnecting said first command signal from said comparison means and impressing said second command signal thereon, whereby the aircraft is directed on a course of flight transition from said glide path to a two-part flight path having discrete rates of descent in accordance with said command signals.

12. Apparatus by means of which an aircraft may be controlled to descend and land on a runway comprising means for providing a signal representative of the rate of change of altitude of said aircraft, first means responsive to said altitude rate signal for providing a first rate of descent control signal of a first predetermined value, second means responsive to said altitude rate signal for supplying a second rate of descent control signal of a second, different predetermined value, and means responsive to the actual altitude of said aircraft for successively supplying output control signals proportional to said first and second rate of descent control signals at successive predetermined actual altitudes of said aircraft.

13. Apparatus by means of which an aircraft may be controlled to descend to and land on a runway comprising means for providing a signal representative of the rate of change of altitude of said aircraft, means responsive to said altitude rate signal for providing a rate of descent control signal having a plurality of predetermined discrete values, and means responsive to the vertical displacement of said craft from the ground for successively supplying an output signal proportional to each of said plurality of rate of descent control signals at successive predetermined values of the vertical displacement of said aircraft from the ground.

References Cited in the file of this patent

UNITED STATES PATENTS 2,678,178  MacCallum _____ May 11, 1954